May 30, 1967

N. H. HAENKY 3,322,149

VALVE HAVING SMALL QUANTITY FLOW PASSAGES

Filed Nov. 6, 1963

INVENTOR
Norman H. Haenky

BY
Mason, Fenwick & Lawrence
ATTORNEYS

May 30, 1967  N. H. HAENKY  3,322,149

VALVE HAVING SMALL QUANTITY FLOW PASSAGES

Filed Nov. 6, 1963  3 Sheets-Sheet 2

INVENTOR
Norman H. Haenky

BY
Mason, Fenwick & Lawrence
ATTORNEYS

May 30, 1967 N. H. HAENKY 3,322,149
VALVE HAVING SMALL QUANTITY FLOW PASSAGES
Filed Nov. 6, 1963 3 Sheets-Sheet 3

INVENTOR
Norman H. Haenky

BY Mason, Fenwick & Lawrence
ATTORNEYS

United States Patent Office 3,322,149
Patented May 30, 1967

3,322,149
VALVE HAVING SMALL QUANTITY FLOW
PASSAGES
Norman H. Haenky, 4418 S. Sandusky,
Tulsa, Okla. 74135
Filed Nov. 6, 1963, Ser. No. 321,778
7 Claims. (Cl. 137—625.12)

This invention relates to valves, and more particularly to improvements in valves of the plug type.

In conventional straight plug valves, sealing is entirely dependent upon line pressure on the plug forcing the plug against the plug chamber wall to seat tightly about the opposite line opening. When the plug or wall becomes worn, leakage will occur. The same result occurs if the plug is scratched or grooved.

The primary object of the present invention is to provide a plug valve having improved sealing means.

A more specific object is to provide a plug valve having self-sealing means at least on the upstream side of the valve plug which provides a primary sealing means for the valve.

Another object is the provision of a plug valve incorporating sealing means at least on the upstream side of the plug, and having means to force the plug into pressure contact with the sealing means to ensure a positive seal.

A further object of the invention is to provide a plug valve which is capable of self-cleaning to prevent build-up of foreign matter on the plug or plug chamber wall, and to remove such matter as may adhere to the plug.

Yet another object is the provision of means to throttle the valve to permit a controlled flow of fluid in much smaller quantity than has been possible with known valves of the general type under consideration.

Still a further object is to provide a plug valve which is so designed that it can be used with corrosive fluids with minimum possibility of corrosion lock.

Another object of the invention is to provide a plug valve with an improved sealing means for the plug stem.

Other objects of the invention will become apparent from the following description of practical embodiments thereof, when taken in conjunction with the drawings which accompany, and form part of, this specification.

In general, the invention concerns a plug valve having at least one resilient seal encircling the outlet end of the inlet passage adjacent the plug for pressure contact with the plug, the seal having a plurality of axially extending openings to assist in the sealing operation and to provide for minimum quantity flow control. A cam, either in the form of a second sealing member or a simple cam, can be used at the inlet end of the outlet passage adjacent the plug, to cooperate with an eccentric plug to create pressure contact of the plug with the first-named seal. The invention is concerned also in an O-ring seal for the plug stem in a stuffing box gland to permit the use of packing if desired.

Figure 1:
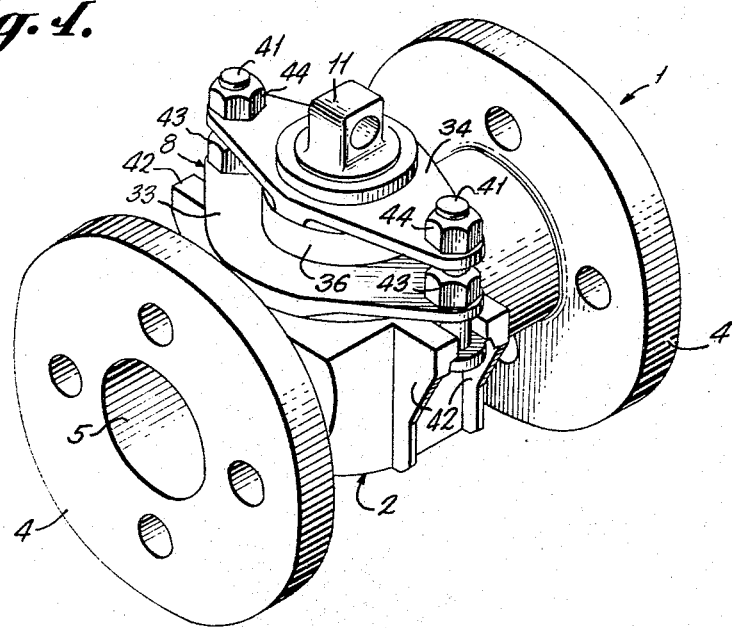
FIGURE 1 is a perspective view of a plug valve embodying the features of the present invention.
Figure 2:
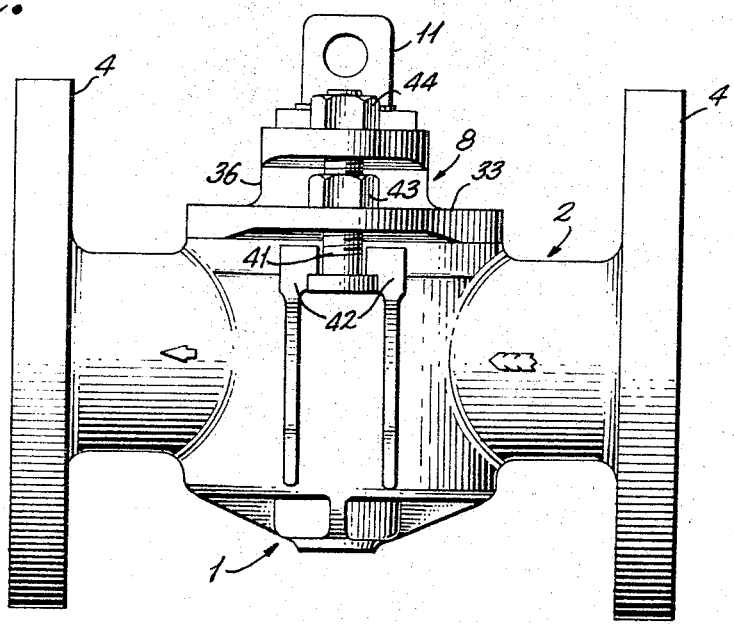
FIGURE 2 is a side view of the valve shown in FIGURE 1.
Figure 3:
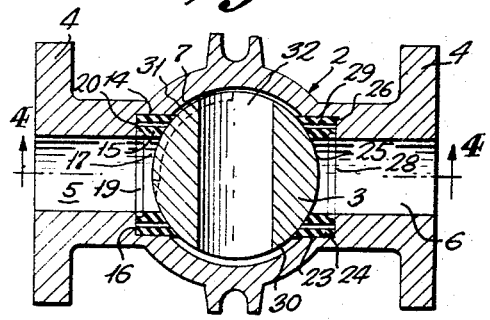
FIGURE 3 is a horizontal section through the valve equipped with double seals, the plug being shown turned to valve-closed position.
Figure 5:
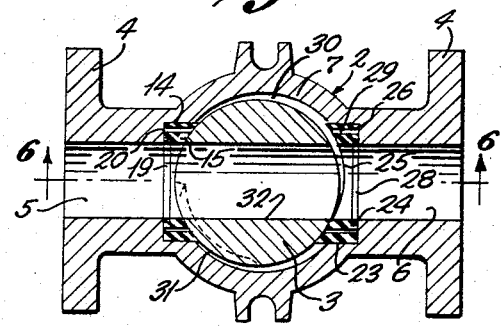
FIGURE 5 is a view similar to FIGURE 3, but with the plug turned to valve-open position.
Figure 4:
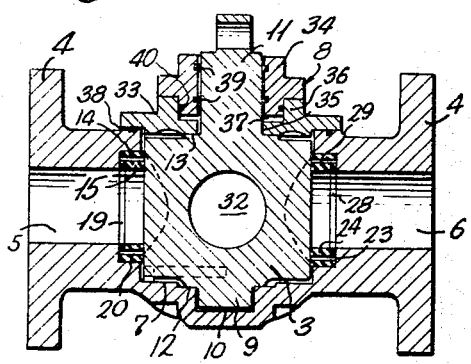
FIGURE 4 is a vertical section through the valve, taken on the line 4—4 of FIGURE 3.
Figure 6:
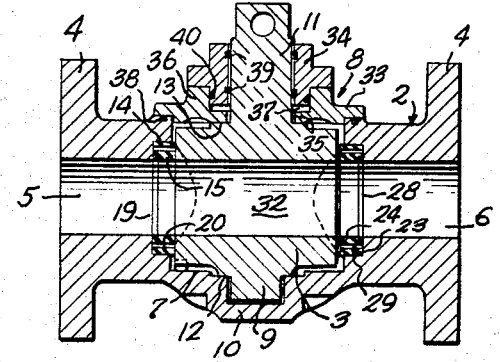
FIGURE 6 is a vertical section through the valve of FIGURE 5, and is taken on the line 6—6 of FIGURE 5.
Figure 7:
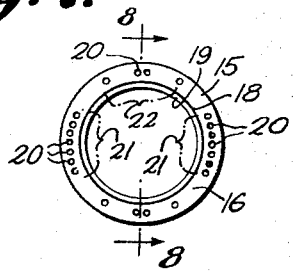
FIGURE 7 is a rear elevation of the seal used on the upstream, or left, side of the valve as shown.
Figure 9:
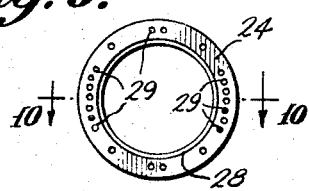
FIGURE 9 is a rear elevation of the seal shown on the downstream, or right, side of the valve shown in FIGURES 3 through 6.
Figure 8:
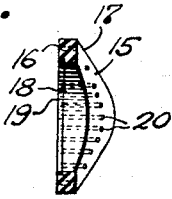
FIGURE 8 is a diametral section through the seal of FIGURE 7, taken on the line 8—8 of FIGURE 7.
Figure 10:
FIGURE 10 is a horizontal section through the seal of FIGURE 9, taken on the line 10—10 of FIGURE 9.

Referring to the drawings in detail, and adverting first to FIGURES 1 through 10, there is shown a plug valve 1 having a body 2 with a plug 3 rotatably mounted within the body. The body has the usual end flanges 4, inlet and outlet passages 5 and 6 and plug chamber 7, with the inlet and outlet passages aligned and diametrically arranged relative to the plug chamber. The plug chamber is open through the top of the body and is closed by a cover 8. The cover will be described later in detail.

The plug 3 has a bottom trunnion 9 which is rotatably seated in a recess 10 in the bottom of the plug chamber of the body. A stem 11 rises from the top of the plug and extends through the cover 8. The plug bottom and top surfaces are offset slightly adjacent the juncture with the trunnion and stem to provide relatively narrow width annular surfaces 12 and 13 for contact with the plug chamber bottom and body cover, respectively. The stem and trunnion are in axial alignment and provide the journalled members for fixing the axis of rotation of the plug. As the plug and plug chamber are designed to permit rotation of the plug without contact with the chamber walls, the only contact of the plug with the valve body is by means of the surfaces 12 and 13. This arrangement prevents corrosion lock when corrosive fluids are being controlled by the valve.

The inlet passage is enlarged at its end adjacent the plug to provide an annular seat 14 about the passage to receive a seal 15. Seal 15 is ring-shaped, having an outer diameter approximating that of seat 14, and an inner diameter equal to the diameter of the inlet passage. The bottom face 16 of the seal, that is that face which bottoms in the seat 14, is flat. The outer face 17, that is the face adjacent the plug, is concave horizontally, having a radius equal to that of the plug surface which moves over the seal. The seal is slightly thicker than the depth of seat 14 at all points to cause the seal to project uniformly beyond the plug chamber wall. This provides a seal which is an annulus having one flat side and one concave side, with the curvature of the concave side extending in the direction of rotation of the plug. Thus, the seal forms the outlet end of the inlet passage and conforms to the shape of the plug wall at the passage.

The seal may be made of suitable material having some compressibility and resiliency. Suitable materials have been found to be synthetic rubber, "Teflon," which is a plastic product sold by Du Pont which is believed to be a tetrafluoroethylene polymer.

Seal 15 is rabbeted around its inner circumference adjacent the seal bottom to provide a seat 18 for a metal ring 19. Ring 19 serves to prevent deformation of the seal from its circular shape under the pressures which will be imposed upon it.

The seal is perforated, or provided with small holes 20 which extend through the material from the bottom face 16 to the working face 17. These openings are closely spaced in groups 21 along the thicker portions of the seal, which will be at the sides of the fluid passage when in place, and more widely spaced in the intermediate areas 22, which will be at the top and bottom of the passage.

The outlet passage 6 also has a seal seat 23 adjacent the plug chamber. A seal identical to the seal 15 may be used in the seat 23, but added advantage can be obtained by using a seal 24 which is similar to seal 15 in all respects except that its concave face 25 is laterally offset from the central axis of the seal and of the outlet passage. In other words, the center from which the arcuate concave surface is struck is offset from the projected central axis of the seal so that the seal is thicker at one side edge than the other and the curvature of the seal is excentric to the rotational axis of the plug. Thus, seal 24 provides a camming surface for the plug, as will be described in detail. In all other respects, the seal is identical to seal 15, as it has an annular shape, a plane surfaced bottom face 26, an annular rabbet 27 to seat a ring 28, and through openings 29 in the same arrangement as in seal 15.

In order to obtain full advantage of the cam-surfaced seal 24, plug 3 is also provided with an excentric surface to coact with the excentric concave surface of the seal. As most plug valves are limited to approximately ninety degrees of rotation from fully open to fully closed position, it not necessary for the plug to have more than one-half of its surface excentric to the rotational axis of the plug. In most cases, the excentric portion will be greater than one-quarter, but less than one-half, the extent of the circumference of the plug. The excentricity is obtained by striking the arc of a portion of the plug surface from a center which is slightly offset from the rotational axis of the plug, and the remainder of the surface from the rotational center. The excentric portion 30 is of less distance from the center of rotation than the concentric portion 31 and is located generally in the area of the outlet end of the plug port 32.

It is to be noted that the plug is slightly smaller than the chamber in which it is seated so that there is no contact between the plug circumferential surface and the cylindrical wall of the plug chamber. This accomplishes two purposes. First, it prevents corrosion lock when the valve is used with corrosive fluids; and, second, it allows some movement of the plug under the camming influence of the offset seal 24 and the excentric surface of the plug to compress and release the seal 15. Some play will be permitted in the trunnion seat 10 also. The same play will be required for the stem so that the necessary bodily shifting of the plug for sealing purposes may be attained.

Cover 8 consists of a bonnet 33 and a packing gland 34. The bonnet provides the closure for the plug chamber, and is centrally apertured, as at 35, to accommodate plug stem 11. The bonnet has an upstanding annular collar 36 which defines a stuffing box 37. An O-ring is mounted in a groove in the valve body top, about the valve chamber, to form a seal. The gland 34 is centrally apertured to receive the plug stem, and is grooved to receive O-rings 39, between the gland aperture and plug stem, and 40, between the gland and the wall of the stuffing box. Compression of the O-rings will permit some bodily movement of the plug, yet retain a seal. The gland, bonnet and valve body may be interconnected by bolts 41, having heads to engage ears 42 on the body. The bolts will extend through openings in the bonnet and gland, and have separate nuts 43 and 44 for the bonnet and gland to permit separate tightening of these elements and removal of the gland without disturbing the bonnet. Packing can be placed in the stuffing box for additional sealing if desired, or to provide a temporary seal if one, or both, of the O-rings 39 should fail.

The valve will be operated as any conventional plug valve for most procedures, but will provide different results, and, in addition, can assume a throttled position wherein the flow through the valve will be reduced to a mere trickle. When the valve is opened for free flow, the plug port 32 will be in alignment with the passages 5 and 6, and the plug will be out of contact with the seals 15 and 24 and the walls of the plug chamber. Turning the plug approximately ninety degrees will rotate the plug port out of registry with the valve body passages and cause the excentric plug surface to move into camming relation with the offset concavity in seal 24, then forcing the plug into sealing engagement with seal 15 and with seal 24. These are the two extreme positions.

If plug 3 is rotated so that port 32 is no longer in communication with passages 5 and 6, but is open to holes 20 in seal 15 and 29 in seal 24, fluid can seep from passage 5 behind seal 15, through holes 20, port 32, holes 29 in seal 24, behind seal 24 to passage 6. This provides for an extremely slow flow, much below that possible with conventional plug valves.

As the plug is turned from the trickle flow position described in the preceding paragraph to the fully off position, the camming action forces the plug into pressure contact with the seal. Fluid in the holes 20 will be trapped, and as the seal is compressed depthwise will cause an expansive pressure radially of the holes. This combined action will force the seal tightly into its seat so that both faces of the seal will be closed off. Pressure of fluid in the passage 5 against the inner circumference of the seal also serves to increase the sealing effect.

When the plug is rotated toward open position, the pressure on the seals is released and the fluid in the openings will discharge onto the plug walls. The wiping action of the seal against the plug as the plug is turned will remove any foreign matter which may adhere to the plug wall. When the plug is in fully open position there is some flow through the seal openings and around the plug. These actions make the seals and plug self cleaning.

Figure 11:
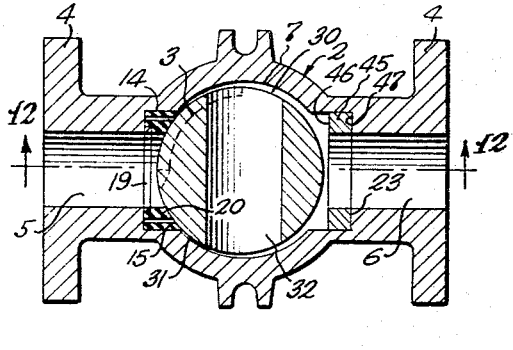
FIGURE 11 is a horizontal section through a valve having a seal on the upstream side and a camming ring on the downstream side, the valve being shown closed.
Figure 13:
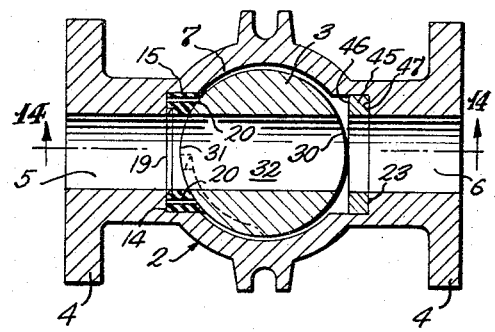
FIGURE 13 is a horizontal section through the valve of FIGURE 11 with the plug in open position.
Figure 12:
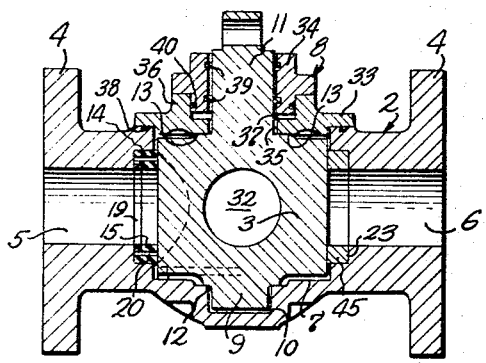
FIGURE 12 is a vertical section through the valve taken on the line 12—12 of FIGURE 11.
Figure 14:
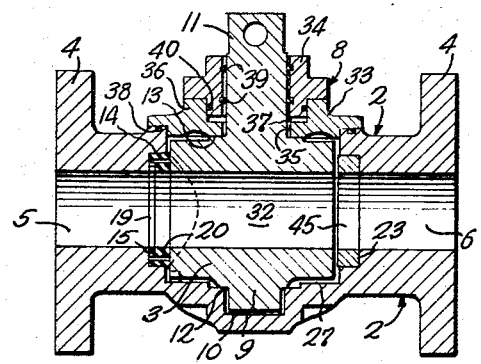
FIGURE 14 is a vertical section taken on the line 14—14 of FIGURE 13.

Turning now to that form of the invention shown in FIGURES 11 through 14 it will be seen that the only difference over the structure previously described lies in the elimination of seal 24 and the installation of a camming ring 45 in its place. As the parts are the same, they have been given the same reference numerals.

Cam ring 45 is an annular member having parallel side faces 46 and 47. Face 47 rests against the bottom of seat 23, and face 46 is the working face of the cam. It will be noted from FIGURES 12 and 14 that the ring is of sufficient depth to extend beyond the seat at the points of contact with the plug.

With this arrangement, the excentric portion of the plug 3 acts against the working face of ring 45 to force the plug into sealing engagement with the seal 15. The action is precisely the same as that previously described except that there is but one seal for the plug, and that seal is on the upstream side of the plug.

While in the above practical embodiments of the invention have been disclosed, it will be understood that the precise details of structure shown and described are merely for purposes of illustration, and the invention may take other forms within the scope of the appended claims.

What is claimed is:

1. In a valve having a body with inlet and outlet passages communicating with a plug chamber in which a plug having a through port is mounted for rotation to position the plug port in and out of registry with the inlet and outlet passages of the body, the improvement comprising, a seal of deformable material at the end of the inlet passage adjacent the plug chamber, the inlet passage having a seat to receive the seal, the seal being an annular ring having a concave face to engage and seal against the rotatable plug, and means for forcing the plug into sealing engagement with the seal at said inlet passage end to prevent flow from the inlet passage to the plug port when the plug occupies a selected out of registry position, said seal has a plurality of holes extending therethrough, opening to the seal seat and the concave face of the seal, and arranged in a path related to the cross-sectional shape of the plug port to dispose different numbers of said holes in registry with said port at different angular positions of the port in an intermediate zone of the range of movement of said plug, and said plug being shaped to dispose said seal so as to admit seepage flow of fluid from said inlet passage between said seat and seal and through said holes into said plug port and thence to said outlet passage when said plug occupies said intermediate zone to provide controlled small quantity flow through said valve.

2. In a valve having a body with inlet and outlet passages communicating with a plug chamber in which a plug having a through port is mounted for rotation to position the plug port in and out of registry with the inlet and outlet passages of the body, the improvement comprising, a seal of deformable material at the end of the inlet passage adjacent the plug chamber, the inlet passage having a seat to receive the seal, and the seal being an annular ring having a concave face to engage and seal against the rotatable plug, the outlet passage having an annular seat in its end adjacent the plug chamber and there is a camming member in the outlet passage seat, the plug having at least a part of its surface excentric to the rotational axis of the plug for cooperative engagement with camming means to force the plug into and release it from sealing engagement with the seal.

3. A valve as claimed in claim 2 wherein, the camming means is a ring of non-deformable material.

4. A valve as claimed in claim 2 wherein, the camming means is a second seal having a concave face whose arc is excentric to the rotational axis of the plug.

5. A valve as claimed in claim 4 wherein, each of said seals has holes therethrough opening to the respective seal seat and to the seal concave face.

6. A valve as claimed in claim 5 wherein, each seal is reinforced with a non-deformable ring.

7. A valve as claimed in claim 5 wherein, the plug is spaced from the walls of the plug chamber.

References Cited

UNITED STATES PATENTS

| | | | |
|---|---|---|---|
| 2,142,795 | 1/1939 | McFarlane | 251—162 |
| 2,373,628 | 4/1945 | Gleeson | 251—315 |
| 2,728,551 | 12/1955 | Blackman | 251—192 X |
| 2,930,576 | 3/1960 | Sanctuary | 251—315 X |
| 3,036,600 | 5/1962 | Vickery | 251—315 X |
| 3,109,623 | 11/1963 | Bryant | 251—315 X |

FOREIGN PATENTS 45,934   10/1935   France.

WILLIAM F. O'DEA, *Primary Examiner.*

H. W. WEAKLEY, *Assistant Examiner.*